United States Patent
Fujino et al.

(10) Patent No.: US 10,407,334 B2
(45) Date of Patent: Sep. 10, 2019

(54) COMPOSITE SHAPED BODY AND SILICA GLASS, AND METHOD FOR PRODUCING THE SAME

(75) Inventors: Shigeru Fujino, Fukuoka (JP); Hiroshi Ikeda, Fukuoka (JP); Seiji Inaba, Fukuoka (JP); Toshihisa Kajiwara, Fukuoka (JP)

(73) Assignee: KYUSHU UNIVERSITY, Fukuoka-shi (JP)

( * ) Notice: Subject to any disclaimer, the term of this patent is extended or adjusted under 35 U.S.C. 154(b) by 549 days.

(21) Appl. No.: 13/382,005

(22) PCT Filed: Jul. 7, 2010

(86) PCT No.: PCT/JP2010/061566
§ 371 (c)(1),
(2), (4) Date: Jan. 6, 2012

(87) PCT Pub. No.: WO2011/004852
PCT Pub. Date: Jan. 13, 2011

(65) Prior Publication Data
US 2012/0107589 A1    May 3, 2012

(30) Foreign Application Priority Data

Jul. 8, 2009 (JP) .................. 2009-162049
Feb. 16, 2010 (JP) .................. 2010-031638

(51) Int. Cl.
*B32B 3/00* (2006.01)
*C03B 20/00* (2006.01)
(Continued)

(52) U.S. Cl.
CPC .............. *C03B 20/00* (2013.01); *B82Y 30/00* (2013.01); *C03B 19/066* (2013.01); *C03B 19/12* (2013.01);
(Continued)

(58) Field of Classification Search
CPC ..... Y10T 428/12319; Y10T 428/12493; Y10T 428/24322; Y10T 428/249953;
(Continued)

(56) References Cited

U.S. PATENT DOCUMENTS 4,885,018 A     12/1989 Bachmann et al.
4,931,413 A *   6/1990 Weir et al. .............. 501/31
(Continued)

FOREIGN PATENT DOCUMENTS

EP     0532113 A1    3/1993
EP     1215180 A1    6/2001
(Continued)

OTHER PUBLICATIONS

International Search Report: dated Aug. 24, 2010; PCT/JP2010/061566.
(Continued)

*Primary Examiner* — Samir Shah
(74) *Attorney, Agent, or Firm* — Ladas & Parry LLP

(57) ABSTRACT

The present invention provides a composite shaped body comprising silica nanoparticles and an organic polymer, wherein the silica nanoparticles and the organic polymer form a three-dimensional network; thereby provides: a composite shaped body which exhibits excellent formability and fabricability and which is also suited for use, for example, in producing a silica glass provided with an electrical conductivity; and a silica glass (especially, an electrically conductive silica glass) obtained by firing the composite shaped body.

15 Claims, 11 Drawing Sheets

(51) Int. Cl.
*C03B 19/06* (2006.01)
*C03B 19/12* (2006.01)
*C08J 5/00* (2006.01)
*C08J 5/02* (2006.01)
*B82Y 30/00* (2011.01)
*C03C 1/00* (2006.01)
*C03C 3/06* (2006.01)

(52) U.S. Cl.
CPC ............... *C03C 1/006* (2013.01); *C03C 3/06* (2013.01); *C08J 5/005* (2013.01); *C08J 5/02* (2013.01); *C03B 2201/30* (2013.01); *C03B 2201/32* (2013.01); *C03C 2201/30* (2013.01); *C03C 2201/32* (2013.01); *C03C 2203/30* (2013.01); *C03C 2203/36* (2013.01)

(58) Field of Classification Search
CPC ....... Y10T 428/2924; Y10T 428/31504; C03C 2203/36; C03C 2203/30; C03C 2201/32; C03B 19/066; C03B 19/12; C03B 20/00; C03B 2201/30; C08J 5/02; B82Y 30/00
USPC .......................................... 428/323
See application file for complete search history.

(56) References Cited

U.S. PATENT DOCUMENTS

| | | | |
|---|---|---|---|
| 5,939,201 | A | 8/1999 | Boire et al. |
| 2002/0037423 | A1* | 3/2002 | Yamamoto et al. .......... 428/516 |
| 2004/0194505 | A1 | 10/2004 | Wang et al. |
| 2005/0025913 | A1* | 2/2005 | Jikihara et al. ............ 428/32.28 |
| 2005/0128754 | A1* | 6/2005 | Redden ............... C04B 38/0054 362/311.02 |
| 2008/0090073 | A1* | 4/2008 | Tomonaga et al. ........... 428/336 |
| 2008/0299405 | A1* | 12/2008 | Wang et al. .................. 428/500 |
| 2009/0061195 | A1 | 3/2009 | Kasai |
| 2009/0197077 | A1 | 8/2009 | Reutler et al. |
| 2010/0147026 | A1 | 6/2010 | Kasai |

FOREIGN PATENT DOCUMENTS

| | | |
|---|---|---|
| JP | 11-504615 A | 4/1999 |
| JP | 2002-145633 A | 5/2002 |
| JP | 2004-155997 A | 6/2004 |
| JP | 2005-145766 A | 6/2005 |
| JP | 2006-232582 A | 9/2006 |
| JP | 2007-261825 A | 10/2007 |
| JP | 2009-007185 A | 1/2009 |
| WO | 2007/101964 A1 | 9/2007 |
| WO | 2009/002708 A1 | 12/2008 |

OTHER PUBLICATIONS

Sunhyung Kim, et al; "Drying of the Silica/PVA Suspension: Effect of Suspension Microstructure", Langmuir, vol. 25(11), pp. 6155-6161; Published on Web May 1, 2009.

Rolf Clasen; "Preparation of coloured silica glasses made by sintering of particulate gels", 2096 Glastechnische Berichte 66(Nov. 1993), No. 11, Frankfurt, DE; 6 pages.

* cited by examiner

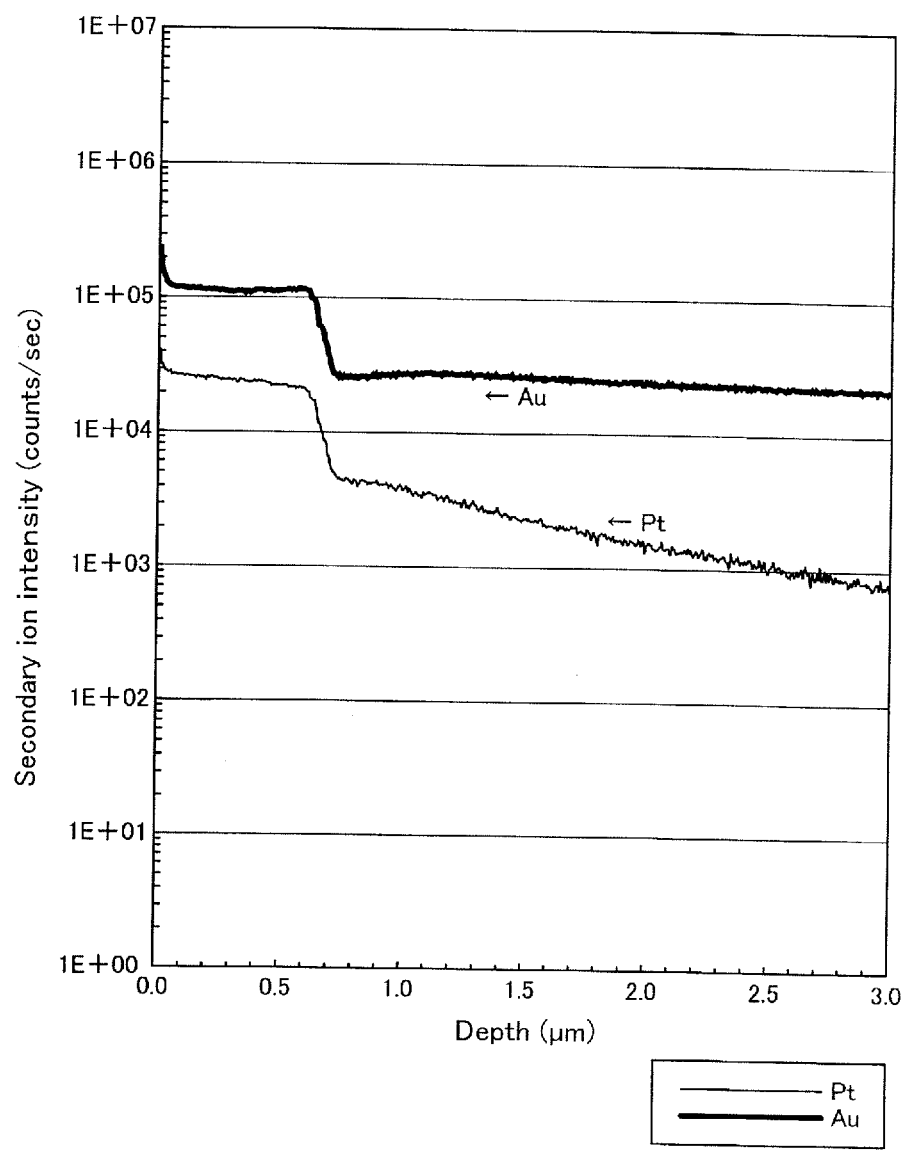

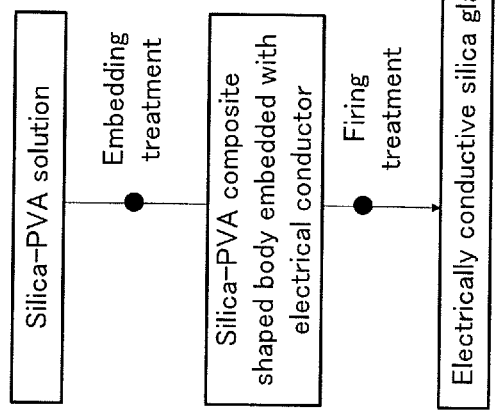

COMPOSITE SHAPED BODY AND SILICA GLASS, AND METHOD FOR PRODUCING THE SAME

TECHNICAL FIELD

The present invention relates to a composite shaped body and a silica glass, and a method for producing the same.

BACKGROUND ART

In the development of micro components made of silica glass and used for highly-functional/highly-integrated devises, it is required to establish fabrication techniques and production processes of the silica glass, ranging from a sub-micro order to a nano order. Silica glass has a variety of excellent physical properties such as low expansion, heat resistance, chemical resistance, and insulation; and also has a high light transmittance in a vacuum ultraviolet to near-infrared wavelength range. As such, silica glass is expected to serve as a base material not only in the fields of information processing and communication but also in the next-generation photonics industry. Further, silica glass has a high viscosity even in a high-temperature region; thus can be formed into a desired shape by repeatedly performing local heating on the silica glass (see Patent Documents 1 and 2, for example).

CITATION LIST

Patent Literature

Patent Document 1: Japanese Patent Application Laid-Open (JP-A) No. 2006-232582
Patent Document 2: JP-A No. 2005-145766

SUMMARY OF THE INVENTION

Problems to be Solved by the Invention

In the conventional methods described above, a tremendous amount of thermal energy is required in fabricating silica glass, and it is impossible to meet the demand for fabrication precision. Therefore, fabrication techniques have been desired that enable easily developing silica micro-optical components having a new three-dimensional structure at low costs. Moreover, development of the production techniques of a silica glass having desired electrical conductivity and/or luminescence properties has been desired.

However, there are no research reports in which the fabrication techniques, and the electrical conductivity or luminescence properties of the silica glass are realized. For example, regarding the imprinting techniques of silica glass as well, although the required property of a predetermined microfabrication precision is achieved in the current processes such as optical lithography and etching, there exist problems in terms of costs, environmental impact, and complicated production processes involving multiple steps.

Further, in recent years, there have been reports on techniques for manufacturing highly-functional micro-devises by laser photochemical processing. However, they relate to a microfabrication technique of a commercially-available silica sheet glass; and do not refer to a production method of a new silica glass.

Further, as a technique related to production of a silica glass having a fluorescence, an improved baycol method may be employed. However, silica glass produced by this technique contains impurities therein and has an insufficient light permeability. Furthermore, when performing a forming process, it is necessary to carry out re-heating, thus requiring a number of production steps and a large amount of thermal energy in the production process.

Furthermore, although silica glass is expected to serve as a base material for the next-generation photonics industry as stated above, there has never been a technique heretofore in which silica glass is provided with an electrical conductivity (in which silica glass is permitted to exhibit electrical conductivity). At present, it is attempted to perform secondary processing on existing silica glass to commercialize it; however, the situation is that there is a difficulty in upgrading techniques of micro-wiring to be performed as one desires, and the like. Further, even if commercialization of a silica glass could be attained with the existing techniques, is seen that high manufacturing costs are required, and that there are problems in wiring adhesiveness, durability, and functionality.

The present invention was made in view of the above problems. And the present invention provides: a composite shaped body which exhibits excellent formability and fabricability and which is also suited for use, for example, in producing a silica glass provided with an electrical conductivity; and a silica glass (especially, an electrically conductive silica glass) obtained from the composite shaped body. It also provides a production method by which to obtain these.

Means for Solving the Problems

In order to solve the above problems, the present invention takes the following configurations. That is, a first aspect of the present invention is a composite shaped body, comprising silica nanoparticles and an organic polymer, wherein the silica nanoparticles and the organic polymer form a three-dimensional network.

In the present invention, the "silica nanoparticle" refers to a silica particle having a nano-order particle diameter. In particular, silica nanoparticles are used which have a particle diameter of preferably 100 nm or less; and more preferably 5 nm or more and 50 nm or less. And silica nanoparticles are used which have an average particle diameter of preferably 5 nm or more and 50 nm or less. In the present invention, a "particle diameter" is observed by using transmission electron microscopy (TEM), and refers to an average value of an equivalent circle diameter of the silica nanoparticle existing in the range of 5 μm×5 μm of a TEM image. The "average particle diameter" refers to an average particle diameter of a silica nanoparticle as a primary particle. The "average particle diameter" can be measured by using a laser type particle size measuring machine. For example, it can be measured by a micro-sorting control method using the laser type particle size measuring machine (a method by which the target particle to be measured is passed only in the measurement region to improve the measurement reliability). In this measuring method, 0.01 g to 0.02 g of the target particle to be measured is poured into a cell; thereby the particle flowing into the measurement region is irradiated with semiconductor laser light having a wavelength of 670 nm. And the scattering and diffraction of the laser light at this point are measured by the measuring machine, thereby calculating an average grain diameter and a grain size distribution based on the principle of Fraunhofer diffraction to obtain the results. The "organic polymer" is any polymer that can be mixed with silica nanoparticles in a solvent (the solvent may be other than water).

In the first aspect of the present invention, it is preferable that the three-dimensional network be formed by dispersing the silica nanoparticles in the organic polymer, and that a nanopore be formed in the organic polymer area. In the present invention, that "dispersing the silica nanoparticles in the organic polymer" refers to a configuration in which the silica nanoparticles and the organic polymer are homogeneously dispersed in a nano order. The "nanopore" refers to a nano-order void created by the entanglement of the organic polymer.

Further, the composite shaped body according to the first aspect of the present invention may be configured such that the nanopore has a diameter of 5 to 50 nm. Also, an average diameter of the nanopore may be approximately 30 nm. This enables the composite shaped body itself to be provided with sufficient strength, and to be easily handled at a time of processing. Additionally, the amount of shrinkage created in a case of being made into a silica glass can be reduced.

Further, in the first aspect of the present invention, a specific surface area based on the BET method is preferably 50 $m^2/g$ or more and 250 $m^2/g$ or less. Within this range, it is possible to allow the composite shaped body to have a more excellent mechanical strength and surface property. For example, assuming a case in which the composite shaped body is provided with an electrical conductor and then fired to be made into a silica glass having an electrical conductor, it is also possible to bond the electrical conductor to the silica glass more strongly after the firing.

Furthermore, in the first aspect of the present invention, a weight ratio of the organic polymer to the silica nanoparticles is preferably 0.02 or more and 0.45 or less. The reason is because this enables obtaining the composite shaped body having more excellent formability and fabricability.

In addition, in the first aspect of the present invention, the organic polymer is preferably at least one selected from a vinyl polymer, an acrylic polymer, and an amide polymer. The reason is because this enables forming a three-dimensional network more properly and obtaining the composite shaped body having even more excellent formability and fabricability.

Further, in the first aspect of the present invention, it is especially preferable that the organic polymer be polyvinyl alcohol. The reason is because it is possible to form a three-dimensional network most properly and to obtain the composite shaped body having the most excellent formability and fabricability.

Herein, when using polyvinyl alcohol as the organic polymer, a number-average degree of polymerization of the polyvinyl alcohol is preferably 500 or more and 2000 or less; more preferably 1000 or more and 1600 or less; and most preferably 1500 in view of attaining a monolithic shaped body. Within this range, it is possible to further improve the formability and fabricability of the composite shaped body.

When using polyvinyl alcohol as the organic polymer, a saponification degree of the polyvinyl alcohol is preferably 50% or more and 90% or less; more preferably 70% or more and 85% or less; and most preferably 80% in view of attaining a monolithic shaped body. Within this range, it is possible to further improve the formability and fabricability of the composite shaped body. It should be noted that in the present invention, "%" in a saponification degree refers to a "mol %".

On the other hand, the composite shaped body according to the first aspect of the present invention may have a doped region in at least a part of the composite shaped body in which region a functional element is doped. Herein, the "functional element" refers, in particular, to an element that can provide an electrical conductivity and examples thereof include a substance originating from metal and metal oxide. As will be described below, by arranging the doped region in advance at the stage of formation of the composite shaped body, a silica glass that is properly provided with an electrical conductivity can be obtained after firing.

When arranging the doped region, the doped region preferably exists all the way from the surface of the shaped body to the inner area.

In addition, the composite shaped body according to the first aspect of the present invention may be configured in such a manner that the electrical conductor is arranged on the surface or in the inner area of the shaped body. That is, it may have configurations such as those in which at least a part of the surface of the composite shaped body is coated with the electrical conductor, or in which the electrical conductor is embedded inside the composite shaped body. For example, when the electrical conductor is provided to the surface of the composite shaped body, a part of the electrical conductor enters the inner area near the surface of the composite shaped body; therefore it is possible to obtain a silica glass to which the electrical conductor is strongly bonded, after firing. Further, when arranging the doped region in a part of the composite shaped body, the electrical conductor is preferably arranged in contact with the doped region. And in this case, an electrically conductive network can be formed in the silica glass obtained after firing, by the interactions of the electrical conductor and the doped region; the disruption and the like of an electrically conductive path can be prevented; and the electrical conductor can be bonded strongly to the glass. On the other hand, when the electrical conductor is arranged inside the composite shaped body, it is also possible to provide, after firing, a silica glass having a completely new configuration in which the electrical conductor is disposed inside. In the present invention, by applying a paste containing an electrically conductive element such as ITO, Au, and Pt to the surface of the shaped body, by means of screen printing, and then firing (the shaped body), it is also possible to exhibit electrical conductivity only in the doped region formed on the surface. That is, it is possible to produce a silica glass whose matrix is transparent and which exhibits the electrical conductivity only in its printed location.

A second aspect of the present invention is a silica glass obtained by firing the composite shaped body according to the first aspect of the present invention.

The silica glass according to the second aspect of the present invention has a light transmittance of 80%; or more in a wavelength of 160 nm, and Vickers hardness of 770 or more.

The silica glass according to the second aspect of the present invention may have a doped region in at least a part of the silica glass in which region a functional element is doped. The silica glass having such a configuration can be easily obtained by firing a composite shaped body having a doped region.

In this case, the doped region preferably exists all the way from the surface of the glass to the inner area. The silica glass having such a configuration can be easily obtained by firing the composite shaped body in which the doped region exists all the way from the surface to the inner area.

In a conventional silica glass, the idea of arranging a doped region in order to impart an electrical conductivity has never occurred. The reason is as follows. Conventionally, a silica glass having a predetermined shape is obtained by melting silica at a high temperature; and even if a functional element is doped in such a melt state, it is difficult to retain the functional element in a specific location, making it impossible to arrange a doped region in a desired part of the silica glass. In addition, even if a functional element is disposed on the glass surface by means of ion implantation or some other means after obtaining a silica glass having a predetermined shape, it is impossible to infiltrate the functional element into the inner part of the glass; that is, a doped region cannot be arranged inside the glass. Doping by a gas phase method or by a liquid phase method may be possible; however, it is difficult to carry out local doping with these two methods. On the other hand, in the present invention, a doped region can be arranged in a desired location (including the inner area of the shaped body) in advance at the stage of formation of the composite shaped body; and by firing the composite shaped body thereafter, a silica glass can be obtained which has a doped region all the way from the surface of the desired location to the inner area.

Further, the silica glass according to the second aspect of the present invention may be configured in such a manner that an electrical conductor is arranged on the surface or in the inner area of the glass. That is, the silica glass may have configurations such as those in which the surface of the glass is coated with the electrical conductor, or in which the electrical conductor is embedded inside the glass. The silica glass having such configurations can be easily obtained by firing the composite shaped body in which the electrical conductor is arranged on its surface or in its inner area. Especially in a case of arranging an electrical conductor on the glass surface, the electrical conductor is preferably in contact with the above-described doped region. The reason is as follows. As described above, an electrically conductive network is formed by the interactions between the electrical conductor and the doped region; the disruption and the like of an electrically conductive path can be prevented; and the electrical conductor can be bonded strongly to the glass. It should be noted that in the present invention, by applying a paste containing an electrically conductive element such as ITO, Au, and Pt to the surface of the composite shaped body, by means of screen printing, and then firing (the shaped body), it is possible to exhibit electrical conductivity only in the doped region formed on the surface. That is, it is possible to produce a silica glass whose matrix is transparent and which exhibits electrical conductivity only in its printed location.

Furthermore, the silica glass according to the second aspect of the present invention may be configured to have an absorption end of 155 nm in a vacuum ultraviolet region, and to have a light transmittance of 80 to 9% in an ultraviolet to visible region.

A third aspect of the present invention is a method for producing a composite shaped body, the method comprising: a first preparation step of dispersing silica nanoparticles in a solvent to prepare a dispersion; a second preparation step of dissolving an organic polymer in a solvent to prepare an organic solution; a mixing step of mixing the dispersion and the organic solution to form a mixed liquid; and a drying step of drying the mixed liquid to form a shaped body having a three-dimensional network of the silica nanoparticles and the organic polymer.

In the third aspect of the present invention, a pH of the mixed solution is preferably 2.0 or more and 4.0 or less. The reason is because this enables further improvement of the formability and fabricability of the composite shaped body obtained.

Further, in the third aspect of the present invention, a doping step of bringing the shaped body into contact with a solution containing a functional element may further be provided. Herein, the "doping step of bringing the shaped body into contact with a solution containing a functional element" means a step of bringing the shaped body into contact with a solution containing a functional element so as to permeate the functional element all the way from the surface of the shaped body to the inner area. More specifically, it encompasses the idea of including a soaking step of soaking the shaped body in the solution containing a functional element, a spraying step of spraying the solution containing a functional element at the shaped body, or some other steps.

Furthermore, in the third aspect of the present invention, a disposing step of disposing an electrical conductor on the surface or in the inner area of the shaped body may be further provided. The "disposing step of disposing an electrical conductor on the surface or in the inner area of the shaped body" is any step of arranging an electrical conductor in the shaped body; and it encompasses the idea of including a coating step of coating the surface of the shaped body with an electrical conductor, an embedding step of embedding an electrical conductor inside the shaped body, or some other steps. Further, the disposing step in the present invention comprises a configuration in which the electrical conductor is disposed at the stage of formation of the mixed liquid, and then the drying step is carried out, resulting in disposition of the electrical conductor on the surface or in the inner area of the shaped body.

A fourth aspect of the present invention is a method for producing a silica glass, the method comprising a firing step of firing a composite shaped body obtained by the method for producing a composite shaped body according to the third aspect of the present invention.

In the fourth aspect of the present invention, the composite shaped body may be further formed/fabricated, and then subjected to the firing step. For example, the firing step may be carried out after the composite shaped body is formed into a desired shape by imprinting or some other means. This enables obtaining a silica glass having a desired shape. In a case of further forming/fabricating a composite shaped body, it is possible to do so at room temperature; therefore, production costs can be lower compared to the case of forming/fabricating a silica glass.

Effects of the Invention

According to the present invention, it is possible to provide: a composite shaped body which exhibits excellent formability and fabricability and which is also suited for use, for example, in producing a silica glass provided with an electrical conductivity; a silica glass (especially, an electrically conductive silica glass) obtained from the composite shaped body; and a production method by which to obtain these.

BRIEF DESCRIPTION OF THE DRAWINGS

FIG. 9 shows the results of a surface analysis showing an existing distribution of a functional element in a silica glass (with sputtering).

FIG. 11 is a flow chart showing a production process of a silica glass according to a third aspect of the present invention.

MODE FOR CARRYING OUT THE INVENTION

1. An Outline of the Present Invention

In the present invention, there are established a production process technique of a composite shaped body composed of nano-sized order silica nanoparticles and an organic polymer, and a production process technique of a silica glass obtained by firing the composite shaped body. Further, a nanoimprinted composite shaped body and sintered body (silica glass) were produced by means of a soft lithography method (a room-temperature nanoimprinting formation method), which does not use a heat imprinting method and thus has few environmental burdens.

A production process technique of a composite shaped body composed of nano-sized order silica nanoparticles and an organic polymer was established, and the composite shaped body obtained was fired in the air at about 1000° C.; thereby a vacuum ultraviolet transparent silica glass was successfully produced.

In general, microfabrication of silica glass is carried out by a combination of photolithography and etching using a plasma or the like. However, there is required a process involving multiple steps such as applications of photoresist, exposure to light, etching, and resist removal. In addition, heat imprinting techniques are employed in some cases; however, a softening temperature of silica glass is very high being as high as 1700° C. or more, thus causing a limitation in selecting a molding material due to the problem of durability, and degrading fabrication precision.

The characteristics of the present invention are to produce a nanocomposite shaped body composed of silica nanoparticles and an organic polymer, and to employ a room-temperature imprint technique making use of an organic/inorganic interface characteristics. In addition, near net shape formation which does not require a high-temperature heat process can be done, thus enabling production of a silica glass by an energy-saving process, in which the shaped body can be directly sintered.

Further, it has been considered infeasible, in terms of the structure of a silica glass, to dope a functional element into a microfabricated silica glass. However, in the present invention, it is possible to dope a functional element in a silica glass. Further, in the present invention, a technique of local doping was also established.

Furthermore, in the present invention, an innovative silica glass having both a transparency and an electrical conductivity can be produced. Moreover, in the present invention, there are provided a new micro-wiring technique, and a technique developing an electrical conductivity, adhesiveness, durability, and transparency for silica glass.

Figure 1:
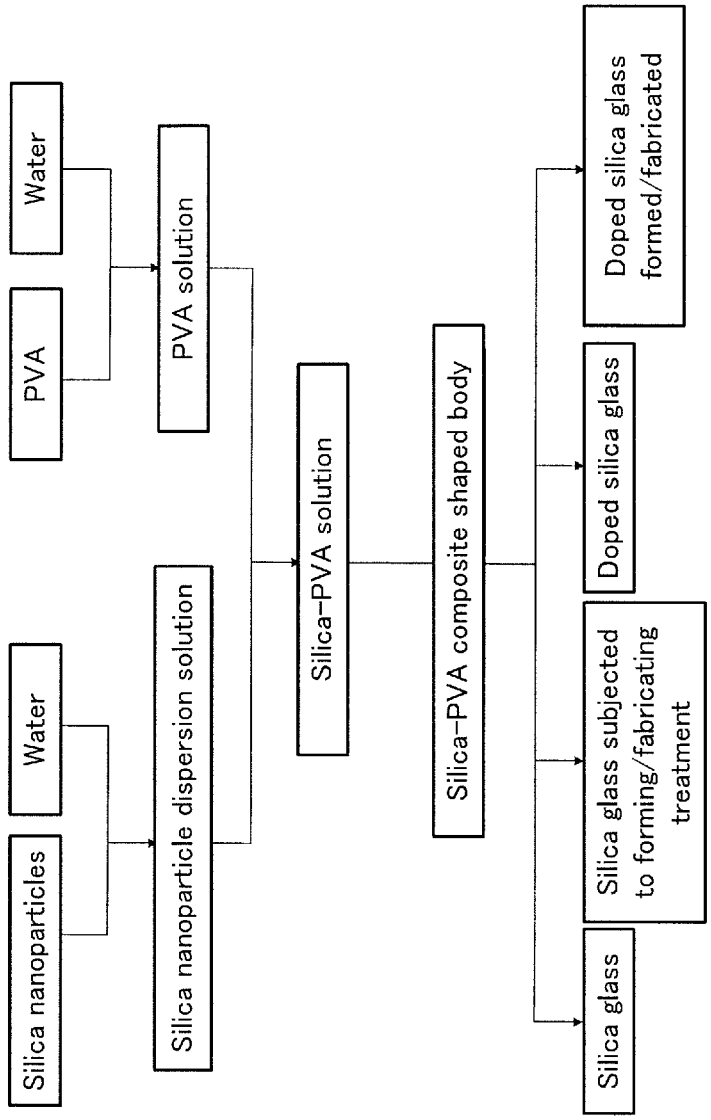
FIG. 1 is a flow chart showing a production process of a silica glass according to one embodiment (a first embodiment) of the present invention.

Hereinafter, the embodiments are described; and the descriptions are made in the following order:

2. a first embodiment of the present invention
3. a second embodiment of the present invention
4. a third embodiment of the present invention 2. A First Embodiment of the Present Invention Hereinafter, a first embodiment as one embodiment of the present invention, will be described in detail. According to this embodiment, a composite shaped body and a silica glass having fluorescence can be produced. FIG. 1 is a flow chart showing a production process of a silica glass in the present embodiment. An embodiment in which PVA (polyvinyl alcohol) is used as an organic polymer will be explained below.

[2-1. Preparation of a Silica-PVA Solution (Preparation Step)]

A silica-PVA solution will be described below in detail. As shown in FIG. 1, the silica-PVA solution is prepared from a silica nanoparticle dispersion solution and a PVA solution.

[2-1-1. Preparation of a Silica Nanoparticle Dispersion Solution (First Preparation Step)]

Silica nanoparticles (an average particle diameter of 7 nm) are added to water so as to have 8 wt %, and ultrasonic dispersion is carried out for 3 hours. By this, it is possible to obtain a silica nanoparticle dispersion solution (suspension), in which silica nanoparticles are homogeneously dispersed in a solvent without agglomeration.

This ultrasonic dispersion and the time therefor are just one example. The method and the time are not particularly restricted as long as dissociation of agglomerated silica nanoparticles can be done; silica nanoparticles may be dispersed in a solvent by stirring with a stirring bar or the like. Further, in the present embodiment, silica nanoparticles having an average particle diameter of 7 nm are used; however, an average particle diameter of a silica nanoparticle is not limited to this. For example, silica nanoparticles having an average particle diameter of less than 50 nm, preferably 5 nm or more and 50 nm or less, may be used. It is sufficient if a particle diameter of a silica nanoparticle is at a nano order; preferably 100 nm or less, and more preferably 5 nm or more and 50 nm or less. In order to dope a functional element into a composite shaped body (described below), it is preferable for a void to exist among the silica nanoparticles evenly. Thus, it is desirable to use silica nanoparticles each particle diameter of which is substantially homogeneous. By this, a doping treatment can be performed with high precision and efficiency.

Further, in order to form a composite shaped body into a desired shape, it is preferable for a void to exist among the silica nanoparticles evenly. Thus, from this viewpoint as well, it is desirable to use silica nanoparticles each particle diameter of which is substantially homogeneous. By this, fabrication can be carried out with high precision and efficiency.

A solvent in which silica nanoparticles are dispersed is not particularly restricted to water. For example, an organic solvent may be used. Especially, as for hydrophilic silica (hydrophilic fumed silica), water is preferable in order to obtain a homogeneously dispersed suspension; but, in a case of obtain a homogeneously dispersed suspension with regard to hydrophobic silica (hydrophobic fumed an organic solvent other than water (alcohol etc.) may also be used. However, as described below, in a case of using polyvinyl alcohol (PVA) as an organic polymer, in order to be able to easily dissolve PVA, water is most preferably used as a solvent. Further, a concentration of weight % of silica nanoparticles may be adequately selected within the limited range that the present invention can be realized. For example, the concentration of weight % may be 1 wt % or more and 20 wt % or less.

[2-1-2. Preparation of a PVA Solution (Second Preparation Step)]

PVA (an average polymerization degree of 1500; a saponification degree of 78 to 80%) is added to water to have 8 wt %, and is stirred at room temperature for 2 or more days; thereby a more homogeneous PVA solution can be obtained.

It should be noted that an average polymerization degree and saponification degree of PVA as well as a concentration of weight % of a PVA solution may be adequately selected, within the limited range that the present invention can be realized. For example, a number-average degree of polymerization of PVA is preferably 500 or more and 2000 or less; more preferably 1000 or more and 1600 or less; and most preferably 1500. A saponification degree of PVA is preferably 50% or more and 90% or less; more preferably 70% or more and 85% or less; and most preferably 80%. Examples of such PVA include polyvinyl alcohol produced by Wako Pure Chemical Industries (a polymerization degree of about 500; a polymerization degree of about 1500; a polymerization degree of about 2000 etc.). As to a concentration of weight % of a PVA solution, it is approximately 1 to 20 wt %; preferably approximately 5 to 10 wt %. Further, the above stirring time is just one example; and the time is not particularly restricted as long as a homogeneous PVA solution can be obtained. For example, the time may be approximately 1 hour or more and 1 day or less. Further, depending on the kinds of PVA, PVA may be stirred with heating in order to be dissolved in water.

Further, not only PVA but also other polymers may be used as the organic polymer. Examples include: natural polymers such as chitin, chitosan, casein, gelatin, collagen, egg white, starch, seaweed, carrageenan, sodium alginate, agar, vegetable viscous substance, xanthan gum, and pullulan; semi-synthetic polymers such as starch-based ones (dialdehyde starch, dextrin, polylactic acid) and cellulose-based ones (methyl cellulose, carboxymethyl cellulose, hydroxyethyl cellulose); and synthetic polymers such as vinyl-based ones (polyvinyl alcohol, polyvinylpyrrolidone), acryl-based ones (sodium polyacrylate, methyl methacrylate), amide-based ones (polyacrylamide), and polyethylene oxide.

Alternatively, a polymer other than the above exemplified organic polymers may be used as the organic polymer of the present invention, as long as it can be mixed with silica nanoparticles in a solvent (the solvent may be other than water).

However, in view of attaining more excellent formability and fabricability of a composite shaped body, it is preferable to use at least one selected from a vinyl polymer, an acrylic polymer, and an amide polymer; and among these, it is especially preferable to use PVA.

[2-1-3. Preparation of a Silica-PVA Solution (Mixing Step)]

The silica nanoparticle dispersion solution and the PVA solution prepared in the above sections 2-1-1 and 2-1-2, are mixed so that a weight ratio of silica and PVA becomes 80 wt % silica-20 wt % PVA; and are stirred at room temperature for 12 hours or more, to thereby obtain a homogeneous silica-PVA solution (8 wt %).

It should be noted that this stirring time is just one example; thus the time is not particularly restricted as long as a homogeneous silica-PVA solution can be obtained. For example, the time may be approximately 0.5 hours or more and 1 day or less. Also, a weight ratio of silica and PVA is not limited to the one described above, and thus can be appropriately modified within the range that silica nanoparticles are adequately filled in PVA. For example, the weight ratio may be determined within the range that it becomes approximately silica: PVA=50 wt %:50 wt % to 90 wt %:10 wt %. Especially among this, the weight ratio of an organic polymer to silica nanoparticles is preferably 0.02 or more and 0.45 or less; more preferably 0.1 or more and 0.3 or less.

Through the above steps, a silica-PVA solution can be obtained. In the present embodiment, a silica nanoparticle dispersion solution and a PVA solution are first prepared separately, and then these solutions are mixed together thereafter; however, silica nanoparticles, PVA, and water may be mixed all together to prepare a silica-PVA solution.

Further, when a silica nanoparticle dispersion solution and a PVA solution are mixed to obtain a mixed solution, the pH of this mixed solution is preferably 2.0 or more and 4.0 or less. When a pH of a mixed solution is within this range, the formability and fabricability of an obtained composite shaped body improve further more. Moreover, as described below, it is possible to easily form a desired nanopore in the three-dimensional network of a composite shaped body.

[2-2. Production of a Silica-PVA Composite Shaped Body (Drying Step)]

The silica-PVA solution produced in the above section 2-1 is cast in a Teflon (registered trademark) container, and is dried in a drier at 30° C. for 7 days, thereby obtaining a 80 wt % silica-20 wt % PVA composite shaped body in which silica nanoparticles and PVA form a three-dimensional network. (It should be noted that the drying time differs depending on the size of a sample: when the sample is small-sized, it can be dried with shorter time than this; and when the sample is large-sized, it requires longer drying time than this.) The silica-PVA composite shaped body is one example of the composite shaped body of the present invention.

Herein, as to a container in which a silica-PVA solution is cast, it is preferable to use the one that has an excellent non-adhesiveness (and that has little interaction with other materials), such as a fluorine resin container. For example, a glass petri dish causes a PVA component in a solution to adhere to the glass, which is likely to cause a negative influence on formability of a shaped body such as resulting in the shaped body with many cracks.

Further, as to the silica-PVA solution, it is preferable to use the one that has a concentration of approximately 8 wt %. If the solution concentration is too low, the shrinkage caused at a time of drying becomes large, causing dryness to easily create cracks in a silica-PVA composite shaped body obtained. Also, if the solution concentration is too high, the viscosity of the solution becomes high, thereby easily causing generation of bubbles at a time of casting or drying. And as a result, a silica-PVA composite shaped body obtained is likely to have a non-uniform structure such as bubbles on the surface or inside thereof.

It should be noted that if the size of a glass to be produced is small, the cracks and bubbles are less likely to be generated; thus concentrations of a silica nanoparticle dispersion solution and a PVA solution may be 1 to 20 wt %. In this instance, a concentration of weight % of a silica nanoparticle dispersion solution and a concentration of weight % of a PVA solution may be adequately determined.

Further in the above description, a silica-PVA solution is cast in a predetermined container; however various forming methods such as injection, extruding, doctor blading, and strip casting may be employed in forming a silica-PVA composite. As a result, any shapes can be formed.

Figure 2:
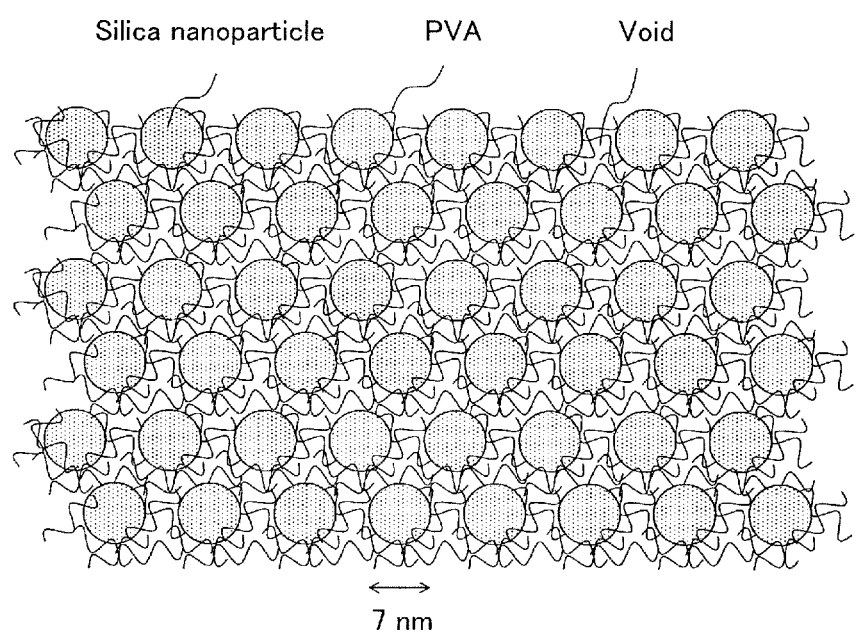
FIG. 2 is a conceptual view of a cross section of a silica-PVA composite shaped body according to one embodiment of the present invention.

Here, a cross section of the above described silica-PVA composite shaped body is conceptually shown in FIG. 2. As shown in FIG. 2, in the three-dimensional network of the silica-PVA composite shaped body, PVA enters among the dispersed silica nanoparticles, and there exists a void (nanopore) between each of the PVA. This enables free movement of the silica nanoparticles in the area that is pressed at a time of performing the below-described room-temperature imprinting, and enables efficient transfer of a nano-order shape. Furthermore, by having a nanopore exist between each of the PVA, the below described functional element can be effectively doped.

The composite shaped body according to the present invention may be configured to have a nanopore with a diameter of approximately 5 to 50 nm, and with an average diameter of approximately 30 nm. Especially, if a pH of the above described mixed solution of silica nanoparticles and PVA is within a range of 2.0 to 4.0 in the stage of formation of the mixed solution, it is possible to easily form a nanopore having such a diameter as above in a post-dried composite shaped body, and to provide the composite shaped body with a sufficient mechanical strength.

It should be noted that in the present invention, the above distribution of a nanopore (a pore distribution) is measured in the following way. That is, a pore distribution of the composite shaped body was measured by using BELSORP-miniII (manufactured by BEL Japan Inc.), based on the principle of a constant-volume gas adsorption method.

Further, it is one of the characteristics of the composite shaped body according to the present invention, that the composite shaped body can have a specific surface area, in addition to the above described pore distribution characteristics. In specific, the specific surface area based on a BET method may be 50 $m^2/g$ or more and 250 $m^2/g$ or less. This enables a composite shaped body to have a more excellent mechanical strength and surface property. For example, assuming a case in which a composite shaped body is provided with an electrical conductor and then fired to obtain a silica glass having an electrical conductor, it is possible to bond the electrical conductor to the silica glass more strongly after the firing.

Furthermore, it is also one of the characteristics of the composite shaped body according to the present invention, that the composite shaped body can have a predetermined mechanical strength (compressive strength), in addition to the above described characteristics of a pore distribution and specific surface area. In specific, when a stress caused at a time of 1% compression was calculated from the stress-strain curves obtained in the measurement in accordance with JTS K7181-1994 (plastic-compressive property test) to determine a compressive strength, the composite shaped body according to the present invention showed a compressive strength of 200 to 1000 GPa. The composite shaped body according to the present invention has such a sufficient and balanced mechanical strength as this; maintains a predetermined shape; and can be easily fabricated.

[2-3. Firing of a Silica-PVA Composite Shaped Body (Firing Step, Production of a Transparent Silica Glass)]

A silica glass can be obtained by firing the produced silica-PVA composite shaped body in the air at approximately 1000° C.

It should be noted that a heating rate is preferably as low as possible. In specific, the heating rate is preferably 1 to 5° C./min. Further, it is desirable to calcine the silica-PVA composite in order to volatilize and burn PVA; and then to fire the silica-PVA composite. A calcination temperature is approximately 600° C. to 950° C. Further, the firing temperature is preferably at or below a softening point of silica. Specifically, firing is performed preferably at 1700° C. or less; more preferably at 1200° C. or less; and in especial preferably at 1050° C. to 1200° C. With this firing temperature range, progression in crystallization and softening of silica can be prevented, and loss of shape can be prevented. In this manner, in the present invention, it is possible to produce a silica glass at a temperature much lower than ever before.

By carrying out the above procedures, a silica glass which is transparent (with a transmittance of 90%, or more in a visible light range) can be obtained. Further, the obtained silica glass showed a transmittance of 80% in a vacuum ultraviolet range. The obtained silica glass showed Vickers hardness, one index of mechanical strength, at 777, which is approximately the same value as that of a commercially available silica glass. Further, the silica glass according to the present invention may be configured to have an absorption end of 155 nm in a vacuum ultraviolet region, and to have a light transmittance of 80 to 90% in an ultraviolet to visible region. The size of a silica glass as a result of firing is smaller than that of a pre-fired composite.

[2-4. Production of a Doped-Type Silica Glass (Doping Step)]

If it is possible to dope a functional element into a silica glass freely without any hindrance, application of a silica glass as a highly-functional material can be expected. For example, it is possible to produce a silica glass that emits various kinds of fluorescence or phosphorescence when irradiated with ultraviolet light or the like. However, due to the characteristics of silica glass, it is difficult to perform doping with an ordinary melting method. As such, a gas phase method and a liquid phase method have been employed heretofore. However, the gas phase method is for producing a thin-film silica glass, and has problems that it requires large equipment, causing high costs, and that it is difficult to perform local doping. Further, a silica glass produced by the liquid phase method is likely to have cracks; thus, the liquid phase method can be applied only to production of a thin silica glass and a grained silica glass, which are unlikely to have cracks.

In the present embodiment, it is possible to dope, into silica glass, gold, silver, or other transition metal elements, and rare-earth elements etc. The doping amount depends on the types of elements, but it is possible to dope up to approximately 1 mol %. Herein, descriptions of doping will be made with examples of silver doping and gold doping. It should be noted that the above mentioned elements are just one example; thus other elements may also be doped. Furthermore, a compound containing the above mentioned elements may also be doped. Specific examples include $Al_2O_3$, and other compounds containing above elements, such as nitrate, oxide, chloride, carbonate, sulfate, organic metal salt; and a hydrate of these compounds.

[2-4-1. Production of a Doped-Type Silica Glass by Means of Soaking]

The produced silica-PVA composite shaped body is soaked in a solution containing silver (e.g. silver nitrate ethanol solution (0.001 mol/L)) for 1 hour, thereby impregnating the silica-PVA composite shaped body with the solution. It should be noted that this soaking time is just one example, and thus is not particularly restricted as long as the shaped body is fully impregnated with the solution. For example, it may be approximately 0.5 hours or more and 1 day or less.

After that, the silica-PVA composite shaped body is fired in the air at approximately 1000° C., The upper limit of a firing temperature is 1700° C. or less, which is at or below a softening point of silica, as described above; the firing is performed in especial preferably at 1050° C. to 1200° C. With this firing temperature range, progression of crystallization and softening of silica can be prevented, and loss of shape can be prevented.

By carrying out the above procedures, a transparent silica glass doped with silver can be obtained. It should be noted that not only one kind of element but also many kinds of elements can be doped into one silica glass.

Further, it is possible to impart various doping patterns by soaking only a part of the silica-PVA composite shaped body.

[2-4-2. Production of a Doped-Type Silica Glass by Means of Spraying]

A solution containing gold (e.g. a gold chloride ethanol solution) is sprayed over (dropped onto) the produced silica-PVA composite shaped body; thereby it is possible to produce a silica-PVA composite shaped body locally doped with gold colloid. Further, by firing the shaped body locally doped with gold colloid at approximately 1000° C., it is possible to produce a silica glass locally doped with gold. As described above, the upper limit of a firing temperature is preferably 1700° C. or less, which is at or below a softening point of silica.

In addition, a patterning size at this point depends on a droplet size of the above described solution; patterning of various sizes, ranging from a nano-order to a centimeter-order can be performed.

For example, a droplet of a gold chloride ethanol solution (0.1 mol/L) having Φ30 μm is sprayed over (dropped onto) a silica-PVA composite shaped body, and the shaped body is fired; thereby it is possible to obtain a silica glass in which gold colloid is locally doped in the Φ30 μm region. It should be noted that not only gold chloride but also various elements can be locally doped. Further, patterning by means of ink-jet is also possible.

In addition, in the present embodiment, a droplet of a solution can be doped, therefore enabling patterning into a desired shape. For example, it is possible to pattern a functional element in a way that a produced silica glass fluoresces in a star shape by ultraviolet irradiation.

Figure 3:
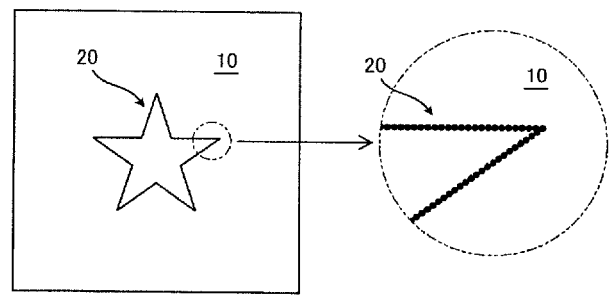
FIG. 3 is a conceptual view showing a manner in which a produced silica glass is doped with a functional element.

FIG. 3 shows a manner in which a produced silica glass 10 is doped with a functional element 20. When the silica glass 10 shown in FIG. 3 is irradiated with ultraviolet light, a star shape appears on the silica glass 10 through fluorescence emitted from the functional element 20.

It should be noted that the patterned shape is just one example; thus any shapes such as desired characters, symbols, prints, and images may be formed. Furthermore, the size may also be adequately determined.

[2-4-3. Production of a Doped-Type Silica Glass by Means of Addition into a Silica-PVA Solution]

Before the drying step described in the above section 2-2. a functional element is added to the silica-PVA solution; this silica-PVA solution added with the functional element is dried to prepare a composite shaped body; and the composite shaped body thus prepared is fired; thereby as well, a doped-type silica glass can be produced. Further, if a composite shaped body doped with a functional element is placed into the silica-PVA solution having no functional elements doped therein, and then is dried, it is possible to produce a composite shaped body having a doped region in a part thereof. And by firing this, it is possible to produce a silica glass having a doped region in a part thereof. Or, in a case as well when a composite shaped body doped with a functional element and a composite shaped body having no functional elements doped therein are combined to be fired together, it is possible to produce a silica glass having a doped region in a part thereof.

[2-5. Formation of a Composite (Fabrication Step)]

A mold having a shape of a periodic structure or the like is pressed against a silica-PVA composite shaped body at room temperature to apply pressure thereto (i.e. performing room-temperature imprinting), thereby enabling transfer of the surface shape of the mold with excellent precision. Further, by firing, at approximately 1000° C., the shaped body to which the shape is transferred, it is possible to produce a silica glass to which the shape is transferred. For example, various shapes may be produced, such as a line and space having approximately 100 nm to several centimeters; a hole; a pillar; and a lens.

Figure 4A:
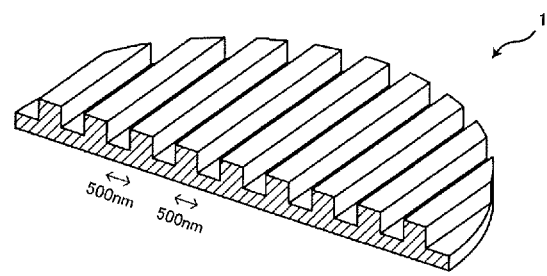
FIG. 4 is a perspective view of a fabricated silica-PVA composite.

For example, a quartz mold having a periodic structure of a 500 nm line and space (e.g. a plate having a concavo-convex shape formed thereon) is placed on the upper surface of the silica-PVA composite shaped body to apply pressure under the conditions of "room temperature, 5 MPa, and 1 min"; thereby the shape of the 500 nm line and space is transferred onto the surface of the silica-PVA composite shaped body. FIG. 4A shows a manner in which each 500 nm line and space shape is transferred to the silica-PVA composite shaped body 1. The shaped body to which the shape is transferred is fired at approximately 1000° C. for several hours; thereby a silica glass to which the periodic structure of the line and space is transferred can be obtained. It should be noted that the width of the line and space may be adequately modified depending on the quartz mold to be used. Further, the pressure conditions may also be adequately modified. The present invention has a characteristics that forming/fabricating at room temperature can be done.

In the present invention, silica nanoparticles in the silica-PVA composite shaped body can freely move in the silica-PVA composite. Therefore, by allowing the silica nanoparticles in the region pressurized at a time of performing the room-temperature imprinting, to move freely in the shaped body, it is possible to effectively transfer a nano-order shape.

Further, by using as the quartz mold, the silica glass to which the periodic structure of the line and space is transferred, it is possible to obtain a silica glass to which a finer periodic structure is transferred.

Figure 4B:
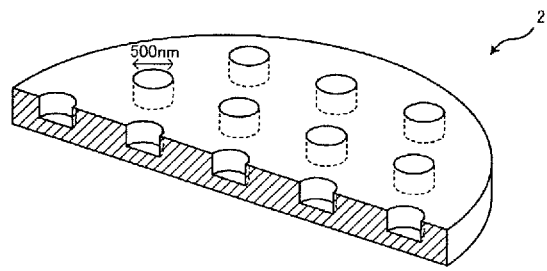

Furthermore, in the present embodiment, as shown in FIG. 4B, it is also possible to produce a silica-PVA composite shaped body 2 in which a circular dent having a diameter of 1 μm is formed.

It should be noted that cutting or punching may be performed; and a combination of these may also be performed. In such a case, the processing can be easily performed with a drill or some other means.

This approach can be applied to a silica-PVA composite shaped body doped with a functional element. That is, firing may be carried out after transferring a form to the composite shaped body in which a functional element has been doped. Also, firing may be carried out after doping a functional element into the composite shaped body to which a form has been transferred. For example, droplets may be dropped into each of the dents of the above described silica-PVA composite shaped body 2 shown in FIG. 4B. Further, by dropping droplets of different elements into each different dent, it is possible to emit different fluorescence in each different dent.

3. A Second Embodiment of the Present Invention

Below are detailed descriptions of a second embodiment as one embodiment of the present invention. According to this embodiment, it is possible to produce a silica glass having both a transparency and an electrical conductivity.

If silica glass can be provided with an electrical conductivity (, or allowed to exhibit electrical conductivity), it is possible to obtain a new material having both a transparency and an electrical conductivity. There have been reports, heretofore, on wiring techniques on glass using an electroless plating; however, there are problems of low adhesiveness of glass and a metal wire to each other (, the metal wire easily coming off), and of low flexibility in wiring patterning. Further, if the surface of the glass on which wiring is performed is fabricated to be uneven, it is possible to adhere glass and a metal wire to each other; however, it is difficult to ensure transparency.

In the present embodiment, based on the new idea of applying the technique for exhibiting fluorescence employed in the above first embodiment, to exhibiting electrical conductivity, a silica glass having both a transparency and an electrical conductivity is produced.

[3-1. An Outline of the Present Embodiment]

Figure 5:
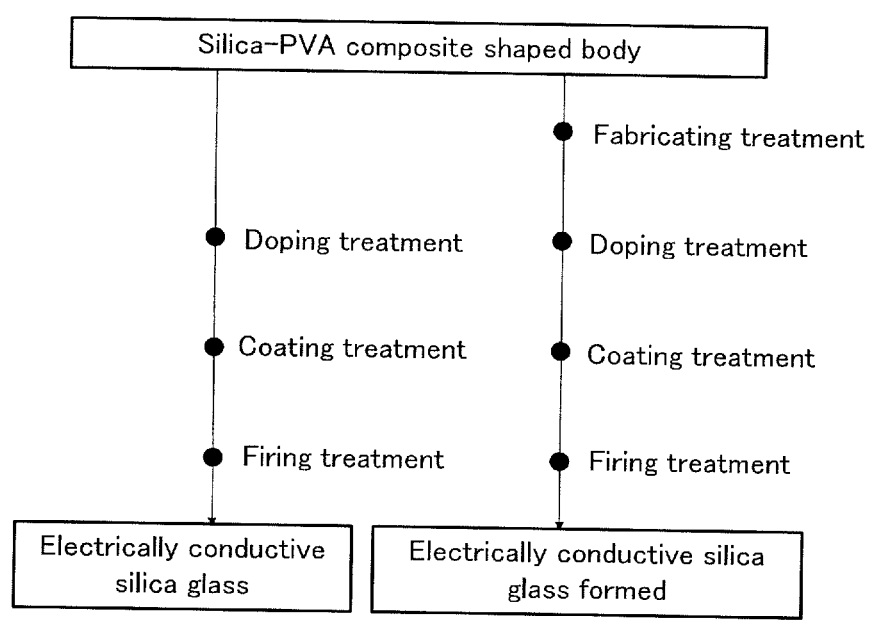
FIG. 5 is a flow chart showing a production process of a silica glass according to a second embodiment of the present invention.

First, an outline of the present embodiment will be given with reference to FIG. 5. As shown in FIG. 5, a composite shaped body is subjected to a treatment of a doping step (doping treatment), a treatment of a coating step (coating treatment), and a treatment of a firing step (firing treatment); thereby an electrically conductive silica glass can be produced.

Further, by subjecting the composite shaped body to a treatment of a fabricating step (fabricating treatment), in addition to these treatments, it is possible to produce an electrically conductive silica glass formed into a desired shape.

In the present embodiment, a composite shaped body produced in the same manner as in the above first embodiment is used. Further, the firing treatment is performed under the same conditions as those of the firing step in the above first embodiment. In order to avoid repeated descriptions, detailed descriptions of the composite shaped body and the firing step will be omitted.

[3-2. Detailed Descriptions of Each Step]

Detailed descriptions of each step of the present embodiment are given below.

[3-2-1. A Doping Step]

In the doping step, within the surface of the composite shaped body, the region which is coated with an electrical conductor in the below described coating step is doped with a desired functional element. It should be noted that this doping step differs from that of the first embodiment, and is not performed for the purpose of allowing a produced silica glass to exhibit fluorescence. It is performed for the purpose of exhibiting electrical conductivity and improving adhesiveness of a coating electrical conductor and the silica glass to each other. Further, a functional element may be doped into the entire surface of the composite shaped body. The doping step of the present embodiment also becomes an effective step for preparing the composite shaped body for the subsequent coating step.

Herein, as for a doping method, any one of the methods shown in the above first embodiment may be employed (see the above sections 2-4-1, 2-4-2, 2-4-3). However, the functional elements to be used are limited to those having an electrical conductivity. For example, they are a metal element and a metal oxide element. Particularly, it is preferable to use gold, silver, copper, ITO etc. Further, as to a doping concentration of a functional element, it needs to be a doping concentration required for at least exhibiting electrical conductivity, or more. That is, of the doping concentrations of a functional element employed in the above first embodiment, the one that enables exhibition of fluorescence but does not enable exhibition of electrical conductivity cannot be applied to the present embodiment. In specific, the doping concentration is preferably 0.1 wt % or more.

[3-2-2. A Coating Step]

In the coating step, the surface of the composite shaped body is coated with an electrical conductor having a desired pattern. In other words, a desired pattern is drawn on the surface of the composite shaped body with an electrical conductor. Herein, as for a coating method, various known techniques such as plating, ink-jet, printing, a gas phase method (sputtering), and a masking method.

Further, within the surface of the composite shaped body, the region doped with a functional element in the doping step is preferably coated with an electrical conductor.

The electrical conductor to coat with may be any as long as it is electrically conductive metal (Pt, Pd, Au etc.). Further, the thickness of the coating electrical conductor is not particularly restricted; however, it may be approximately 200 nm. It should be noted that the thickness of the coating electrical conductor may be adequately adjusted depending on the material quality of the electrical conductor.

Next, a mechanism in which silica glass exhibits electrical conductivity by means of the doped functional element and the coating electrical conductor, will be explained in detail with reference to FIG. 6.

Figure 6A:
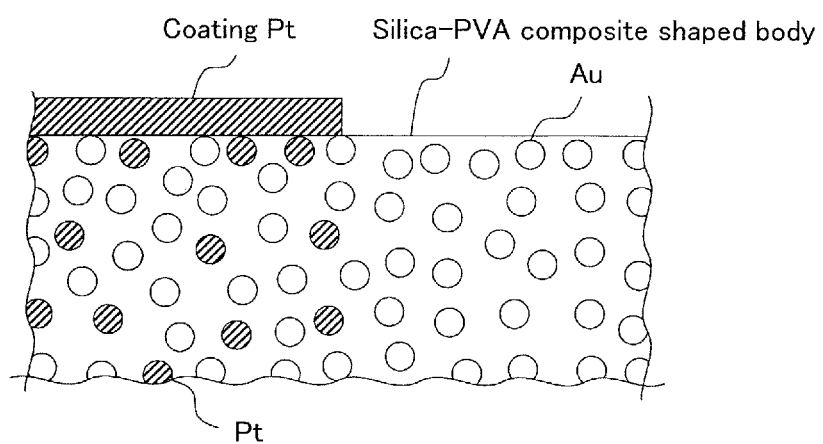
FIG. 6 is a conceptual view showing a manner in which an electrical conductor network is formed.
Figure 6B:
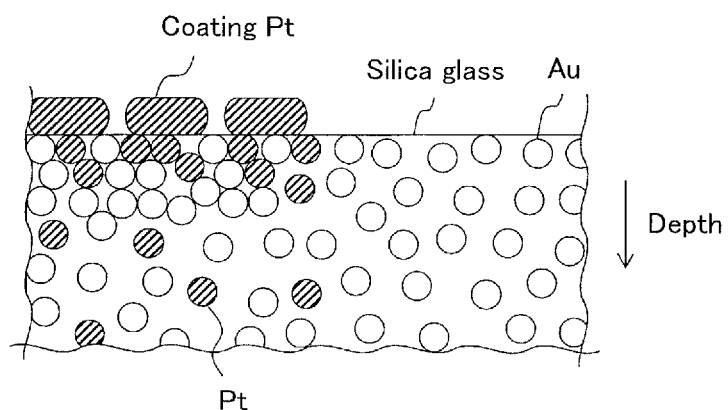

FIG. 6A shows a cross section of the surface of the composite shaped body, on which surface any position on the region doped with Au is coated with Pt. FIG. 6B shows a cross section of this surface of a silica glass obtained after firing (the composite shaped body). It should be noted that FIGS. 6A and 6B schematically show the cross sections for the purpose of showing the existing distributions of Au and Pt; and thus the component ratio and the size differ from the actual ones. Further, actual materials to be doped and to coat with are not limited to Au or Pt; they may be any as long as they have an electrical conductivity.

As shown in FIG. 6A, it is assumed that apart of Pt is diffused and penetrated into the composite shaped body at a time of coating with Pt.

Further, as shown in FIG. 6B, it is assumed that in the firing step, Au and Pt in the composite shaped body gather around the region coated with Pt. On the other hand, apart of the coating Pt is melted in the firing step, and this melted Pt is seen to penetrate into the composite shaped body (A nanometer-sized metallic material is known to show a phenomenon different from a bulk state, which is, for example, decline in a melting point. It is seen that, in the present embodiment as well, melting and mass transfer (diffusion) of the coating Pt as seen in FIG. 6 occurred as a result of that).

Because of this, the coating Pt is partly melted and fragmented in the firing step. However, it is seen that an electrical conductor network is formed of:

(1) the coating Pt partly melted and fragmented;

(2) the Au in silica glass gathering around the region coated with Pt;

(3) the Pt in silica glass gathering around the region coated with Pt;

(4) the Pt existing in silica glass through melting and penetration.

As a result, the area where the electrical conductor network is formed eventually has an electrical conductivity. Further, formation of an electrical conductor network increases an anchoring effect, resulting in increased adhesiveness of the coating Pt to the silica glass.

Figure 7A:
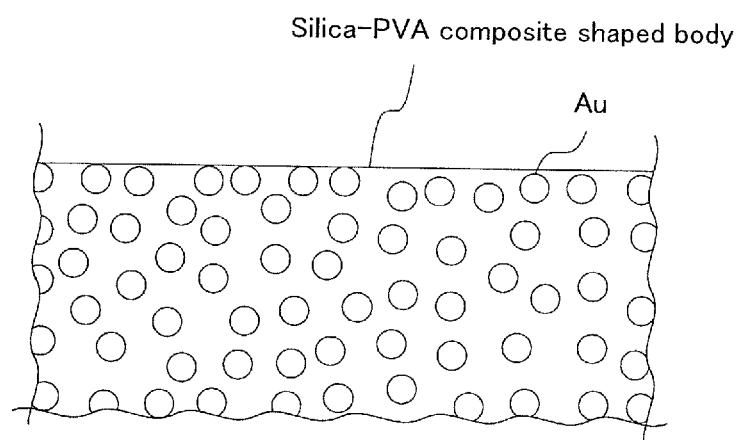
FIG. 7 is a conceptual view showing a distribution of a functional element.
Figure 7B:
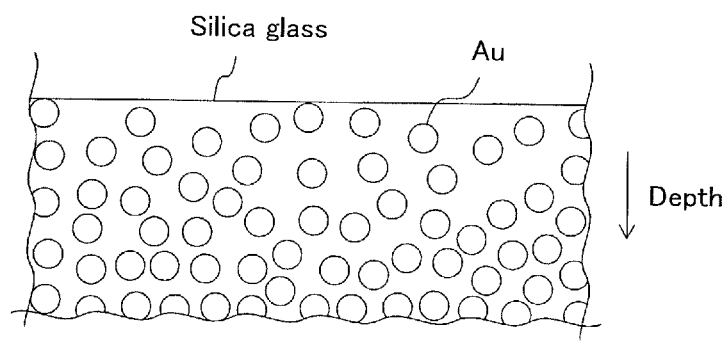

Herein, a case will be described in which a composite shaped body is doped with a functional element and is not coated with an electrical conductor. FIG. 7A shows a cross section of the surface of the composite shaped body which is doped with Au. FIG. 7B shows a cross section of this surface of a silica glass obtained after firing (the composite shaped body). As shown in FIG. 7A, the doped Au is dispersed in the composite shaped body. As shown in FIG. 7B, more amount of the doped Au is present in a deep area of the silica glass obtained after firing.

It should be noted that FIGS. 7A and 7B schematically show the cross sections for the purpose of showing the existing distribution of Au; and the component ratio and the size differ from the actual ones.

As shown in FIG. 7B, in a case of not coating with an electrical conductor, more amount of the doped Au is present in the deep area of the silica glass. Further, it is difficult to form an electrical conductor network as formed in the case of coating with an electrical conductor, and it is hard to obtain an electrically conductive silica glass. However, it is seen that an electrically conductive path can be formed in the deep area by adjusting the doping amount.

Next, a case will be described in which only coating of a composite shaped body with an electrical conductor is performed without performing doping of a functional element.

Figure 8A:
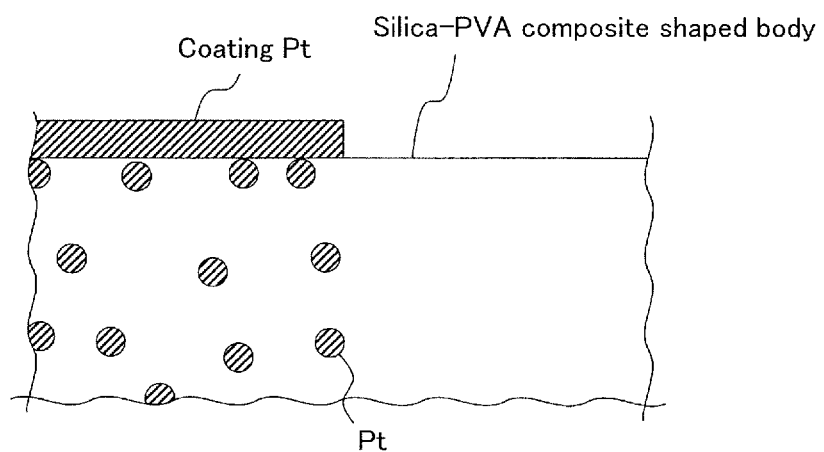
FIG. 8 is a conceptual view showing a manner in which to coat with an electrical conductor without doping a functional element.
Figure 8B:
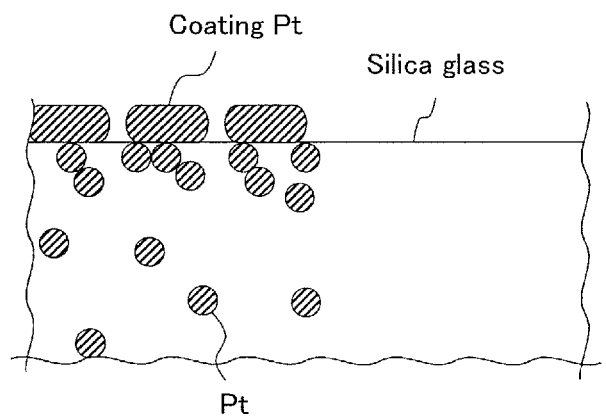

FIG. 8A shows across section of the surface of the composite shaped body at a time when any position on the composite shaped body is coated with Pt. FIG. 8B shows a cross section of this surface of a silica glass obtained after firing.

As shown in FIG. 8B, in a case of not doping a functional element, it is assumed that when a coating Pt is partly melted and fragmented in the firing step, a density of the functional element existing in the silica glass is low, causing difficulty in forming an electrical conductor network. As a result, it is difficult to obtain an electrically conductive silica glass. Further, since the electrical conductor network is not formed, a sufficient anchor effect cannot be exerted, and adhesiveness of the coating Pt to the silica glass is low, causing the Pt to come off easily. However, by adjusting the amount of Pt to be applied, fragmentation of the electrically conductive path after firing can be prevented. Further, by allowing a part of Pt to be penetrated inside, adhesiveness of the electrical conductor to the glass can be improved. That is, a paste with a predetermined concentration which contains an electrically conductive element is applied to the surface of the shaped body by means of screen printing and the like; and then the resultant is fired; thereby it is possible to obtain an electrically conductive silica glass having a transparent matrix and having an electrical conductivity only in the printed location, without having to carry out additional coating steps.

Further, it should be noted that FIGS. 8A and 8B schematically show the cross sections for the purpose of showing the existing distribution of Pt; and the component ratio and the size differ from the actual ones.

In this way, there are cases when it is impossible to allow silica glass to exhibit electrical conductivity just by doping a functional element into the composite shaped body. Also there are cases when it is impossible to allow silica glass to exhibit electrical conductivity just by coating the composite shaped body with an electrical conductor. On the other hand, as in the present embodiment, when a functional element is doped into the composite shaped body and this doped region is coated with an electrical conductor, it is possible to allow silica glass to exhibit electrical conductivity more properly.

That is, in the present embodiment, with the new idea of combining the two seemingly unrelated techniques (i.e. doping into and coating of a composite shaped body), it is possible to produce a silica glass which is provided with an electrical conductivity more properly than ever before.

Further, in the present embodiment, it is possible to coat an electrical conductor having a desired pattern over the surface of the composite shaped body; therefore, it is possible to provide designs such as wiring on the produced silica glass. Further, by drawing a circuit directly on the composite shaped body by means of ink-jet (a printing technique), micro-wiring in which a wire width is from several to several tens μm (e.g. 5 to 20 μm) can be done. And besides, it is not necessary to use an original plate; therefore production costs of an electrical conductive silica glass can be reduced. This enables attaining a small-sized circuit, and this circuit can be used for various kinds of electronic appliances and the lke. That is, it is possible to increase high versatility of the electrically conductive silica glass produced by the present embodiment.

[3-2-3. A Fabricating Step]

In the fabricating step, in order to form a silica glass to be produced into a predetermined shape, a pre-fired composite shaped body is fabricated into a predetermined shape, as in the above first embodiment (see the above section 2-5).

Further, in FIG. 5, the treatment of the fabricating step is performed prior to the doing step; however, it may be performed after doping a functional element (i.e. after the doping step). Further, it may be performed after the coating step.

[3-3. Results of a Surface Analysis of the Silica Glass]

Next, results of a surface analysis of the silica glass produced by the present embodiment are described. The production conditions and method of the surface analysis of the silica glass employed for this surface analysis are as follows.

(Production Conditions)

The amount of Au doped into a composite shaped body was set at 1.0 mol/L. After that, Pt sputtering (with a coating thickness of approximately 200 nm) was performed on the surface of the composite shaped body, and then firing is carried out.

(Method of the Surface Analysis)

An elemental analysis was conducted, by using secondary ion mass spectrometry, in a depth direction of the surface of the silica glass obtained after firing (primary ion species: Cs+; primary ion energy: 5 keV; area of analysis: 50×100 μm).

Figure 10:
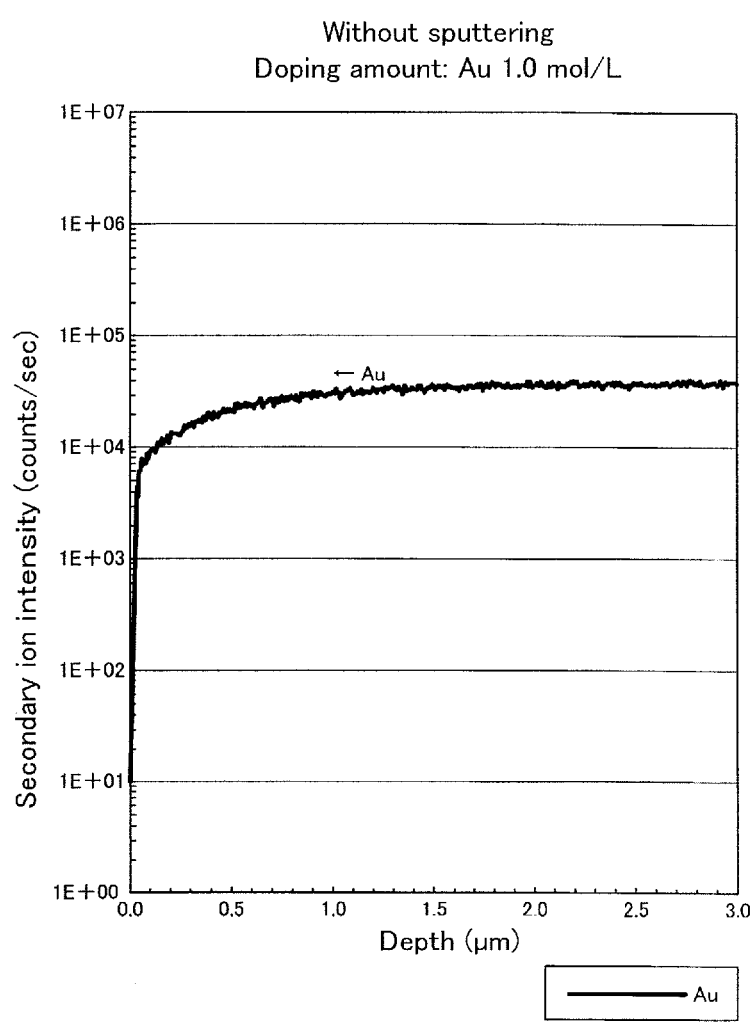
FIG. 10 shows the results of a surface analysis showing an existing distribution of a functional element in a silica glass (without sputtering).

FIG. 9 shows the distributions of Au and Pt on the surface part inside the silica glass which part is doped with Au and coated with Pt. FIG. 10 shows a distribution of Au on the surface part inside the silica glass which part is doped with Au.

FIGS. 9 and 10 plot a secondary ion intensity in the vertical axis, and a depth of the silica glass in the horizontal axis. As shown in FIG. 9, it can be seen that a large amount of Pt in the silica glass is present around the surface of the silica glass. Further, as shown in FIGS. 9 and 10, by coating with Pt, Au gathers on the surface of the silica glass.

It is seen that this enables formation of an electrical conductor network around the surface of the silica glass and enables exhibition of electrical conductivity more properly. Further, formation of the electrical conductor network increases the adhesiveness of the coating electrical conductor to the silica glass. It should be noted that FIGS. 9 and 10 show just one example of the results of the analysis; it is assumed that similar results will be obtained also in a case of doping other functional elements or in a case of coating with other electrical conductors.

As explained above, according to the present embodiment, based on the new idea of using the technique for exhibiting fluorescence for the purpose of exhibiting electrical conductivity, it is possible to produce a new silica glass having both a transparency and an electrical conductivity.

Furthermore, the adhesiveness of the silica glass and the coating electrical conductors to each other can be increased; and the durability and functionality of the electrically conductive silica glass can also be improved. In addition, micro-wiring can be performed on the silica glass, enabling applications of the produced electrically conductive silica glass to a wide variety of technical fields.

4. A Third Embodiment of the Present Invention

Hereinafter, detailed descriptions of the third embodiment as one embodiment of the present invention. According to this embodiment, an electrically conductive silica glass can be produced.

In the present embodiment, a composite shaped body embedded with an electrical conductor is fired, thereby producing a silica glass having both a transparency and an electrical conductivity. That is, by embedding an electrical conductor in a composite shaped body before firing, it is possible to dispose the electrical conductor on a produced silica glass.

In the present embodiment, a composite shaped body produced in the same manner as in the above first embodiment is used. To avoid repeated descriptions, detailed descriptions of the composite shaped body are omitted.

An electrical conductor may be any as long as it is a material having an electrical conductivity such as metal wires (e.g. ultrathin metallic wires) and metal plates.

The treatment of the embedding step (embedding treatment) may be carried out before the above described drying step; or it may be carried out before the firing step.

First, the embedding treatment that is carried out before the drying step will be described with reference to FIG. 11A. An electrical conductor is embedded into a silica-PVA solution cast into a Teflon (registered trademark) container, and the silica-PVA solution is dried in this state; thereby a composite shaped body embedded with an electrical conductor can be produced.

It should be noted that as in the above second embodiment, the treatment of the fabricating step may be carried out, in which treatment a pre-fired composite shaped body is fabricated into a predetermined shape.

Next, the embedding treatment that is carried out before the firing step will be described with reference to FIG. 11B. An electrical conductor is sandwiched by two composite shaped bodies to form one composite shaped body; thereby, a composite shaped body embedded with an electrical conductor can be produced. It is also possible to produce a composite shaped body embedded with an electrical conductor, by pressing an electrical conductor against a composite shaped body. It should be noted that a composite shaped body embedded with an electrical conductor may be produced by a method other than these.

By firing the composite shaped body thus produced, it is possible to produce a silica glass embedded with an electrical conductor, namely a silica glass permitted to exhibit electrical conductivity. It should be noted that an end portion of the electrical conductor needs to be exposed on the surface of the silica glass.

Further, as in the above second embodiment, the treatment of the fabricating step may be carried out, in which treatment a pre-fired composite shaped body is fabricated into a predetermined shape. This fabricating treatment may be carried out before the embedding treatment; or it may be carried out after the embedding treatment.

As described above, according to the present embodiment, an electrical conductor is embedded into a transparent silica glass; thereby a silica glass having both a transparency and an electrical conductivity can be produced.

Further, since it is not necessary to dope a functional element in a composite shaped body, an electrical conductive silica glass can be produced by a simple step.

Furthermore, by embedding the electrical conductor in the silica glass, it is possible to increase durability and functionality of the electrically conductive silica glass.

So far, the present invention has been described based on the first to third embodiments. Silica glass of the present invention can be used, for example, for optical integrated substrate glass materials; micro-optical devises such as a luminescent glass; microchannels; nanochannels; microarrays; nanoarrays; and various kinds of sensor substrates.

For optical uses, the present invention can be applied to transparent fluorescent materials, micro-optical components, ultraviolet light detecting sensor substrates, etc. Also, for electrical and electronic uses, the present invention can be applied to transparent electrically-conductive glass substrates, identification micro-code marking, etc. Furthermore, for chemical and biological uses, the present invention can be applied to DNA chips, SAM film substrates, surface plasmons, wire embedding channels, high-functionalization of a glass surface, etc.

That is, the present invention can be applied in a wide range of technical fields such as an optical material industry, a bio material industry, and electrical and electronic industries.

Detailed descriptions of the embodiments according to the present invention have been given. However, the present invention is not limited to the above described embodiments; and various kinds of modifications may be done based on the technical idea of the present invention. Further, silica nanoparticles having an average diameter of 50 nm or more may be used, and silica nanoparticles each particle size of which is substantially non-uniform, may also be used.

Additionally, by subjecting one composite shaped body to the treatments for exhibiting fluorescence of the above first embodiment, and to the treatments for exhibiting electrical conductivity of the second and third embodiments, it is possible to produce a transparent silica glass having a fluorescence in one part of the silica glass and having an electrical conductivity in another part of the silica glass.

The invention claimed is:

1. A composite shaped body, consisting of silica nanoparticles, an organic polymer, and a functional element, wherein the silica nanoparticles consist of hydrophilic or hydrophobic fumed silica and are dispersed in the organic polymer;
a nanopore is formed in the organic polymer area;
a weight ratio of the organic polymer to the silica nanoparticles is 0.02 or more and 0.45 or less,
the organic polymer comprises polyvinyl alcohol,
a saponification degree of the polyvinyl alcohol is 70% or more and 85% or less,
a number-average degree of polymerization of the polyvinyl alcohol is 500 or more and 2000 or less, and
the functional element exists all the way from at least a part of a surface of the shaped body to an inner area, to form a doped region, wherein the functional element is selected from the group consisting of aluminum oxide ($Al_2O_3$), copper, gold, silver, nitrate of gold or silver, oxide of gold or silver, chloride of gold or silver, carbonate of gold or silver, sulfate of gold or silver, organic metal salt of gold or silver, and hydrate compounds of gold or silver.

2. The composite shaped body according to claim 1, wherein the nanopore has a diameter of 5 to 50 nm.

3. The composite shaped body according to claim 1, wherein a specific surface area of the composite shaped body based on the BET method is 50 m2/g or more and 250 m2/g or less.

4. The composite shaped body according to claim 1, wherein an electrical conductor is arranged on the surface or in the inner area of the shaped body.

5. The composite shaped body according to claim 4, wherein the electrical conductor is arranged in contact with the doped region.

6. A silica glass which is obtained by firing the composite shaped body according to claim 1.

7. A method for producing the composite shaped body according to claim 1, the method comprising:
a first preparation step of dispersing only silica nanoparticles in a solvent to prepare a dispersion, wherein the silica nanoparticles consist of hydrophilic or hydrophobic fumed silica;
a second preparation step of dissolving an organic polymer in a solvent to prepare an organic solution, wherein the organic polymer comprises polyvinyl alcohol, a saponification degree of the polyvinyl alcohol is 70% or more and 85% or less, and a number-average degree of polymerization of the polyvinyl alcohol is 500 or more and 2000 or less;
a mixing step of mixing the dispersion and the solution to form a mixed liquid, wherein a weight ratio of the organic polymer to the silica nanoparticles in the mixed liquid is 0.02 or more and 045 or less; and
a drying step of drying the mixed liquid, wherein the silica nanoparticles are dispersed in the organic polymer and a nanopore is formed in the organic polymer area, to form a shaped body,
the method further comprising:
adding, a functional element to the mixed liquid; or
bringing the shaped body into contact with a solution containing a functional element,
wherein the functional element is selected from the group consisting of aluminum oxide (Al2O3), copper, gold, silver, nitrate of gold or silver, oxide of gold or silver, chloride of gold or silver, carbonate of gold or silver, sulfate of gold or silver, organic metal salt of gold or silver, and hydrate compounds of gold or silver.

8. The method for producing a composite shaped body according to claim 7, wherein a pH of the mixed solution is 2.0 or more and 4.0 or less.

9. The method for producing a composite shaped body according to claim 7, the method further comprising a disposing step of disposing an electrical conductor on the surface or in the inner area of the shaped body.

10. A silica glass which is obtained by firing a composite shaped body,
wherein:
the composite shaped body consists of silica nanoparticles and an organic polymer;
the silica nanoparticles consist of hydrophilic or hydrophobic fumed silica and are dispersed in the organic polymer;
a nanopore is formed in the organic polymer area;
a weight ratio of the organic polymer to the silica nanoparticles is 0.02 or more and 0.45 or less;
the organic polymer comprises polyvinyl alcohol,
a saponification degree of the polyvinyl alcohol is 70% or more and 85% or less; and
a number-average degree of polymerization of the polyvinyl alcohol is 500 or more and 2000 or less.

11. The silica glass according to claim 10, having a light transmittance of 80% or more in a wavelength of 160 nm, and Vickers hardness of 770 or more.

12. The silica glass according to claim 10, wherein an electrical conductor is arranged on the surface or in the inner area of the glass.

13. The silica glass according to claim 10, having an absorption end of 155 nm in a vacuum ultraviolet region, and having a light transmittance of 80 to 90% in an ultraviolet to visible region.

14. A method for producing a silica glass, the method comprising a firing step of firing a composite shaped body, wherein:
the composite shaped body consists of silica nanoparticles and an organic polymer or consists of silica nanoparticles, an organic polymer and a functional element;
the silica nanoparticles consists of hydrophilic or hydrophobic fumed silica and are dispersed in the organic polymer;
a nanopore is formed in the organic polymer area of the composite shaped body;
a weight ratio of the organic polymer to the silica nanoparticles is 0.02 or more and 0.45 or less;
the organic polymer comprises polyvinyl alcohol,
a saponification degree of the polyvinyl alcohol is 70% or more and 85% or less;
a number-average degree of polymerization of the polyvinyl alcohol is 500 or more and 2000 or less; and
in the case where the composite shaped body consists of the silica nanoparticles, the organic polymer and the functional element, the functional element exists all the way from at least a part of a surface of the shaped body to an inner area, to form a doped region, wherein the functional element is selected from the group consisting of aluminum oxide (Al2O3), copper, gold, silver, nitrate of gold or silver, oxide of gold or silver, chloride of gold or silver, carbonate of gold or silver, sulfate of gold or silver, organic metal salt of gold or silver, and hydrate compounds of gold or silver.

15. The method for producing a silica glass according to claim 14, wherein the composite shaped body is further formed/fabricated, and then subjected to the firing step.

* * * * *